Sept. 21, 1965  J. W. EWING  3,207,562
ENDLESS TRACK CONVERSION KIT FOR WHEELED VEHICLES
Filed April 1, 1963  2 Sheets-Sheet 1

INVENTOR
John W. Ewing

BY Shlesinger, Shlesinger & Arkwright

ATTORNEYS

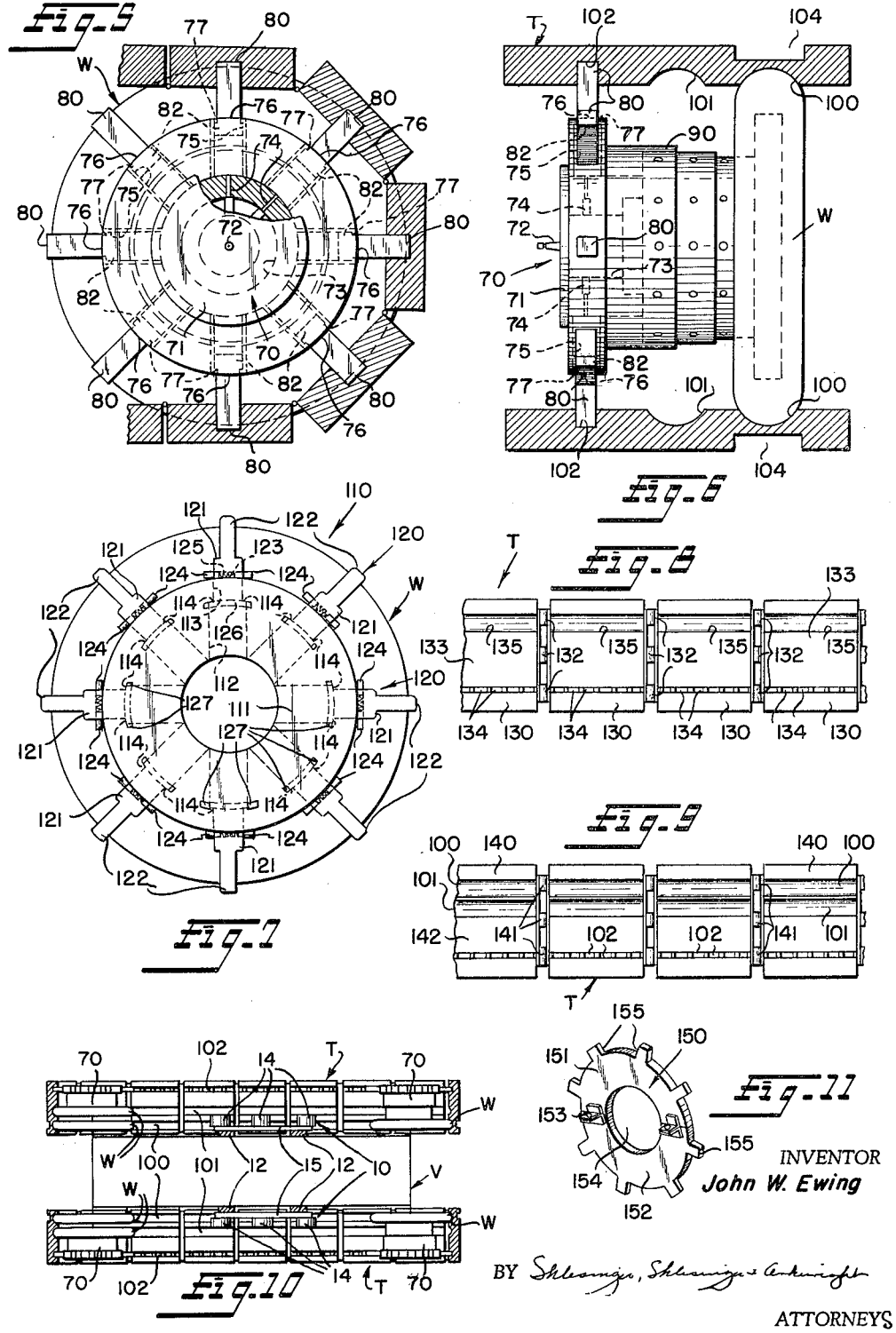

United States Patent Office 3,207,562
Patented Sept. 21, 1965

3,207,562
ENDLESS TRACK CONVERSION KIT FOR WHEELED VEHICLES
John W. Ewing, 5112 41st Ave., Apt. 405, Hyattsville, Md.
Filed Apr. 1, 1963, Ser. No. 269,379
10 Claims. (Cl. 305—57)

This invention relates to attachments to conventional land vehicles for the purpose of converting them to endless track type vehicles.

Military logisticians and tacticians have been confronted with problems created by the obstacles presented by the terrain in many areas of the world during the movement of troops and supplies from one point to another destination. Construction companies are confronted with moving supplies in areas wherein the physical characteristics of the area are not sufficient to provide the needed traction for movement of conventional wheeled land vehicles. It is desirable to have a vehicle capable of moving over sand, snow, mountainous areas, and swampy areas or marshes, or soft areas of ground. It is therefore an object of this invention to provide for the conversion of a conventional land vehicle which will provide the necessary traction for operation upon soft support surfaces.

This invention is also for the purpose of providing an economical way for farmers and individuals in the field of agriculture to be able to have the use of a track type vehicle.

Another object of this invention is to provide a conversion kit which will enable a person to readily and quickly convert a land vehicle to a track type vehicle.

It is another object of this invention to provide a track adapter kit for land vehicles that is inexpensive and easy to manufacture.

Still another object of this invention is to provide for a means for the movement of the track by means other than by the frictional engagement of conventional wheels with the track.

Also an object of this invention is to provide a conversion kit which may have a portion of the kit permanently installed on the vehicle.

It is still another object of this invention to provide a conversion kit which is light weight and easily handled by one individual during installation and removal.

These and other objects of this invention will become apparent from a reading of the following specification and claims.

In the drawings:

FIGURE 5 is a front elevational view partially in section of another form of the drive means;

FIGURE 6 is a side elevational view partially in section of the drive means of FIGURE 5 connected to a track;

FIGURE 7 is a front elevational view of another form of the drive means;

FIGURE 8 is a fragmentary view showing the inside face of the track;

FIGURE 9 is a fragmentary view showing the inside face of another form of the track;

FIGURE 10 is a diagrammatic view in plan showing the tread of FIGURE 5 cut away at the top thereof to illustrate how it is connected to the wheels of a land vehicle;

FIGURE 11 is a perspective view of an additional sprocket for driving the track;

Figure 1:
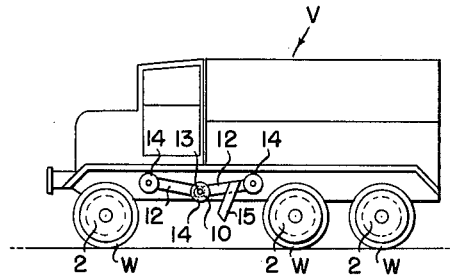
FIGURE 1 is a side elevational view of a conventional land vehicle having a portion of this invention connected thereto.

FIGURE 1 shows a conventional land vehicle V having conventional land vehicle wheels W thereon. Mounted to the outside of the wheels W are track drive assemblies 2. The drive assemblies 2 may be mounted to the outside of the wheels W by any suitable means. Bogie assembly 10 can be mounted to the vehicle at V by any suitable means.

Bogie assembly 10 includes connecting bar members 12 pivotally connected at pivot 13. Connected to the ends of connecting bar members 12 are freely rotatable wheel members 14. Pivotally connected to one of the connecting bar members 12 is a shock absorber member 15. The bogie assembly 10 is shown in the disassembled position, FIGURE 1, and is held in this position by any suitable means. In the assembled position, FIGURE 2, the connecting bar members 12 are pivoted downward and shock absorber member 15 has its free end attached to the other connecting bar member 12.

Figure 2:
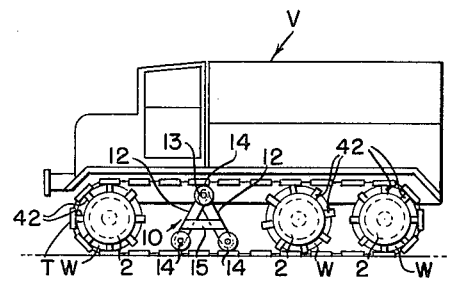
FIGURE 2 is a side elevational view of the conventional land vehicle of FIGURE 1 with the conversion kit of this invention applied thereto.

FIGURE 2 shows the drive assembly 2 having track engaging members extended and in engagement with a track T. The bogie assembly 10 is shown in the operating position and has wheel members 14 engaging with a groove in the track. The groove will be explained later in the specification. The shock absorber member 15 tends to retract the connecting bar members 12 toward each other.

Figure 3:
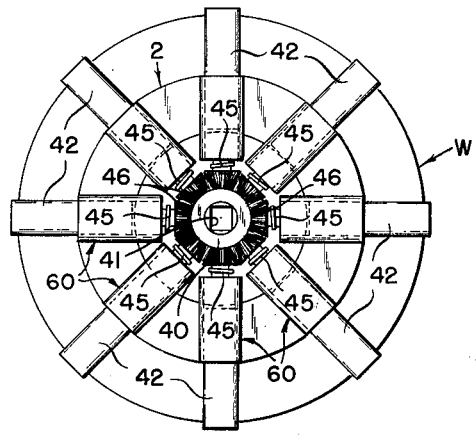
FIGURE 3 is a front elevational view partially in section showing one form of the drive means for the track.

The track drive assembly 2 of FIGURE 3 includes a beveled gear 40. Gear 40 has an opening 41 therein for the insertion of a crank. The assembly 2 also includes a plurality of tubular piston members 42. Piston members 42 have threaded inner walls 44. Rotary threaded shaft members 45 have the threads thereof engaging with the threaded inner walls 44 of piston members 42. Each of shaft members 45 has a beveled gear in engagement with gear 40. By having gear 40 rotated in one direction by a crank, the shaft members 45 rotate thereby unscrewing from piston members 42. The piston members 42 may be extended to any desired position. Any suitable locking means may be provided for locking the piston members 42 in the extended position. In rotation of gear 40 in the opposite direction, the piston members 42 are retracted.

Figure 4:
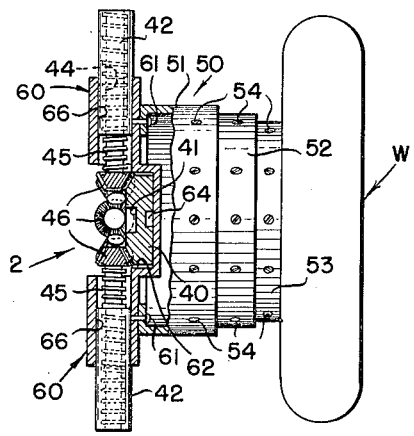
FIGURE 4 is a side elevational view partially in section of the drive means of FIGURE 3.

FIGURE 4 shows track drive assembly 2 connected to the wheel W by telescoping support member 50. Support member 50 includes tubular sleeve 51, tubular sleeve 52 and sleeve 53. Only three parts to the telescoping support member are shown. For further extension of track drive assembly 2, as many telescoping member as desired may be used. A plurality of locking members 54 are used to lock one sleeve with respect to another. Any suitable locking means may be used in this application. Sleeve 53 may be connected to the outer side of wheel W by any suitable means.

Tubular sleeve 51 has housing 60 connected to the free end thereof by suitable fastening means 61. Housing 60 and tubular sleeve 51 may be integral rather than comprising two pieces of material. Housing 60 includes a well 62 for housing the gears for this drive assembly. In the bottom of well 62 is a post 64 for gear 40. Gear 40 is freely rotatable on post 64. Housing 60 includes a plurality of passageways 66 extending radially from well 62 in a direction substantially parallel to wheel W. In use, the telescoping support member 50 is extended to the desired position, and then the piston members 42 can be extended to the desired length.

FIGURE 5 shows a track drive assembly 70. Track drive assembly 70 includes a fluid cylinder 71 and a valve member 72. Fluid cylinder 71 includes a cavity 73 for containing a fluid injected through valve member 72, a plurality of orifices 74 extending radially from cavity 73. Orifices 74 extending in a direction substantially parallel to wheel W. Fluid cylinder 71 has a plurality of passageways 75 extending in a direction substantially in line with orifices 74. Passageways 75 have open ends 76 including shoulder 77. Telescoping within passageways 75 are pistons 80. Pistons 80 include enlarged shoulder portions 82 on the inner end thereof. Valve member 72 may be of the type used in hydraulic or fluid jacks.

Fluid cylinder 71 is connected to wheel W by telescoping support member 90. Support member 90 may be of the type disclosed for FIGURE 4. An alternate construction of support member 90 would include extension means for the support member 90 by extending the segments of support member 90 by a fluid means similar to fluid operated jacks. In the use of a fluid means for extending support member 90, a valve could be included on the support member and locking members could be used such as those locking members as disclosed for FIGURE 4.

Track T includes grooves 100 and 101 on the inner face thereof. The grooves 100 and 101 run the longitudinal length of each segment of the track and in effect provides two continuous grooves on the inside surface of the endless track T. Included in track T are a plurality of spaced apertures 102 therein. Apertures 102 are spaced the longitudinal length of track T and are spaced so as to provide means for engagement of each of pistons 80 with the track when pistons 80 are extended. Also included in track T is a groove 104 on the outer face thereof. Groove 104 runs the longitudinal length of the endless track T. The purpose of groove 104 is for engagement with a railway track for the movement of the converted vehicle in a manner similar to railroad motor cars. Groove 101 is included in case the track T is to be used on a vehicle having dual tires. It will be obvious that piston 80 may be automatically retracted by a spring (not shown) operating against shoulder portion 82.

FIGURE 7 shows a track drive assembly 110 mounted to a wheel W in a manner similar to the connection means for the track drive assembly 70 of FIGURES 5 and 6. Track drive assembly 110 includes a housing 111. Housing 111 has a plurality of passageways 112 extending radially from the center axis of the housing 10. Passageways 112 includes restricted openings 113, thereby providing shoulder portions 114. Slidably mounted in passageways 112 are pistons 120. Pistons 120 include an enlarged portion 121 and a portion of smaller diameter 122. Included in enlarged portion 121 is aperture 123 having lock members 124 therein. Lock members 124 are spring urged outwardly from the aperture by spring member 125. Suitable retaining means is provided in the aperture 123 for limiting the outward movement of the lock members 124. Enlarged portion 121 includes at the inner end thereof, flange portions 126. In FIGURE 7, holes 127 are provided to permit insertion of a tool to depress the lock members 124. Flange portions 126 limit the outward movement of piston 120 by having the flange portion 126 engage shoulder portion 114. As shown in FIGURE 7, lock members 124 are urged outward by the spring member 125, and thereby prevent movement of piston 120 into passageway 112. As shown in FIGURE 7, the piston 120 is locked. In this locked and extended position, portions 122 of pistons 120 engage with apertures in a track, such as apertures 102 of the track T of FIGURE 6. To release pistons 120 from the extended position, a person may manually push lock members 124 inward until the outer ends thereof are flush with the edges of enlarged portion 121, and then the piston 120 may be pushed into passageway 112.

FIGURE 8 shows a plurality of link members 130 pivotally connected at each end at 132. Pivotal connection 132 may be any suitable hinge connection. On the inner face 133 of link member 130 there are plurality of apertures 134. Apertures 134 are for the desired drive means, proposed in this invention, to engage the track for the movement for the track. Groove 135 is provided for the engagement of the wheel of the vehicle.

FIGURE 9 shows the inner face of link members 140. Link members 140 are pivotally connected at each end at hinge portion 141. FIGURE 9 is a showing of the inner face of the track shown for FIGURE 6. The inner face 142 includes grooves 100, 101 and apertures 102.

FIGURE 10 shows one of the track drive assemblies of this invention mounted to the front and rear wheels of a dual wheeled vehicle. The track drive assemblies mounted on the front wheels have the telescoping support member extended outward so as to have the projected pistons in line with respect to the pistons of the track drive assemblies on the rear wheel.

FIGURE 11 shows a sprocket member 150 having semi-circular portions 151 and 152. Portions 151 and 152 are connected by suitable fastening means 153. With portions 151 and 152 connected to each other, an opening 154 is formed. Opening 154 is for the purpose of encircling the axle between two wheels of a dual wheeled vehicle such as is shown in FIGURE 10. Teeth members 155 engage with apertures in a track, to provide additional drive means for the track. The apertures for teeth members 155 would be similar to the apertures proposed in the track in this invention.

Figure 12:
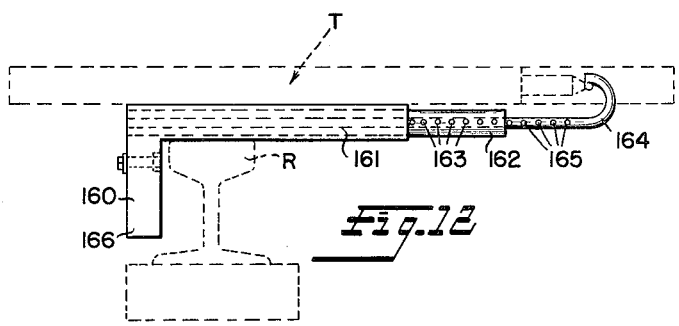
FIGURE 12 is a front elevational view of an attachment to the track for the purpose of using the vehicle on a railway system.

FIGURE 12 shows a railroad rail engaging member 160 for the tracks of this invention, to provide for means to secure the track vehicle to a railroad track R. Member 160 includes a tubular member 161 having second tubular members 162 secured therein. Tubular member 162 has a plurality of apertures 163 therein. Telescoping within tubular member 162 is a hook member 164. Hook member 164 has a plurality of apertures 165 therein. A suitable pin may be used to selectively adjust the telescoped length of hook member 164, and the pin may be used to lock the hook member in the desired extended position. Member 160 includes a downwardly extending arm portion 166. As shown in FIGURE 12, the hook member 164 engages with the hinge portion of a track, and arm portion 166 in effect acts as a hook around the rail R. A plurality of members 160 may be connected to each track of the vehicle, to provide for the securement of the vehicle to the railroad track T.

The track drive assemblies of this invention may be made of a cast or a molded metal material such as aluminum or steel, or any other suitable material. The tracks of this invention may be made of aluminum, plastic, hard rubber, steel, or any other suitable material.

The tracks of this invention may include cleats and fillets on the outer face thereof.

The grooves on the inner face of the track for engagement with the vehicle's wheels and the groove on the outer face of the track for engagement with a railroad rail may be coated with an abrasive material or may have roughened surfaces for the purpose increasing traction.

The width and thickness of the tracks of this invention will be varied depending on the class of vehicle used, the environment of the area in which the vehicle will be operated, and the variation in sizes of the telescoping support members.

It can be readily seen that the track drive assembly of this invention transmits power from the wheels, from which they are attached, to the track.

Most vehicles in use today employ a steering device, and it is a simple matter to lock the steerable wheels of the vehicle for the purpose of using a track. Also the brake system of the vehicle may be modified to provide selective braking for either track to allow steering of the vehicle.

*Operation*

It can be readily seen that a vehicle may be driven on to the track of this invention, the track connected, and the piston members of the drive assemblies extended until they engage with the apertures of the track.

The track may be removed by retracting the piston members, disconnecting the track, driving the vehicle off the track, and storing the track in a desirable place, such as the trunk of the vehicle.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art in which the invention pertains, and as may be applied to the essential features hereinbefore set forth and as fall within the scope of the invention or the limits of the appended claims.

Having thus described my invention what I claim is:

1. A tread drive vehicle, comprising:
   (a) a vehicle which travels on a highway and has aligned front and rear wheels on each side thereof forming a set of wheels, each wheel having a hub with a tire mounted thereon;
   (b) a tread adapter member integrally supported by each of said hubs adjacent the outer side of the corresponding wheel;
   (c) an endless tread on each side of said vehicle which is disposed around and supported on each of the sets of wheels and their corresponding tread adapter members;
   (d) radially extending tread engaging means on said tread adapter member which are laterally spaced and extend outwardly from said wheel for engaging and supporting each endless tread in position, and
   (e) said tread having means thereon for engaging said wheels and a means for receiving said radially extended tread engaging means of said tread adapter member.

2. A tread drive vehicle as set forth in claim 1 wherein:
   (a) said adapter member has means for varying the lateral displacement of said tread engaging means from its corresponding wheel.

3. A tread drive vehicle as set forth in claim 1 wherein:
   (a) said tread engaging means comprises at least two telescoping tubular members; and
   (b) locking means carried by said tubular members for fixing the axial positions of said telescoping tubular members with respect to each other.

4. A tread drive vehicle, comprising:
   (a) a vehicle which travels on a highway and has aligned front and rear wheels on each side thereof forming a set of wheels, each wheel having a hub with a tire mounted thereon;
   (b) a tread adapter member integrally supported by each of said hubs adjacent the outer side of the corresponding wheel;
   (c) an endless tread on each side of said vehicle which is disposed around and supported on each of the sets of wheels and their corresponding tread adapter members;
   (d) a plurality of radially extending engaging elements on each tread adapter member which may be moved outwardly to engage and support said endless tread; and
   (e) said tread having means thereon for engaging said wheels and a member for receiving said radially extending tread engaging means of said tread adapter member.

5. A tread drive vehicle, as set forth in claim 4, wherein:
   (a) a common actuating means is connected to said radially extending engaging elements for controlling the simultaneous outward movement of all of said members.

6. A tread drive vehicle as set forth in claim 4, wherein:
   (a) said common actuating means is a gear driven assembly.

7. A tread drive vehicle as set forth in claim 4, wherein:
   (a) said common actuating means is an hydraulic assembly.

8. A tread drive vehicle, comprising:
   (a) a vehicle which travels on a highway and has aligned front and rear wheels on each side thereof forming a set of wheels, each wheel having a hub with a tire mounted thereon;
   (b) a tread adapter member integrally supported by each of said hubs adjacent the outer side of the corresponding wheel;
   (c) an endless tread on each side of said vehicle which is disposed around and supported on each of the sets of wheels and their corresponding tread adapter members;
   (d) a plurality of radially extending passageways on the outer side of and integral with said adapter;
   (e) an elongated piston member reciprocally mounted in each of said passageways, and having an outer end section which projects radially outward beyond the outer end of said passageways for engaging said tread;
   (f) a rotatable threaded shaft means engageable with each of said pistons for controlling radial movement of said pistons when said shaft is rotated;
   (g) gear means integrally connected with each of said rotatable shaft means to control rotation thereof, and
   (h) said tread having means thereon for engaging said wheels and a means for receiving said radially extending tread engaging means of said tread adapter member.

9. A tread drive vehicle as set forth in claim 8, wherein:
   (a) said gear means includes a small bevel gear which is integral with each of said rotatable threaded shaft means; and
   (b) a central circular bevel gear which meshes with all of said small bevel gears, and upon rotation thereof acts to rotate said rotatable threaded shaft means.

10. A tread drive vehicle, comprising:
    (a) a vehicle which travels on a highway and has aligned front and rear wheels on each side thereof forming a set of wheels, each wheel having a hub with a tire mounted thereon;
    (b) a tread adapter member integrally supported by each of said hubs adjacent the outer side of the corresponding wheel;
    (c) an endless tread on each side of said vehicle which is disposed around and supported on each of the sets of wheels and their corresponding tread adapter members;
    (d) a plurality of radially extending passageways on the outer side of and integral with said adapter;
    (e) an elongated piston member reciprocally mounted in each of said passageways, and having an outer end section which projects radially outward beyond the outer end of said passageways for engaging said tread;
    (f) the inner end of said passageways being closed so that a closed chamber is formed between the inner most end of said pistons and the inner periphery of said passages;
    (g) an hydraulic conduit means connected to each of said chambers for supplying a fluid under pressure for extending said pistons radially outward, and
    (h) said tread having means thereon for engaging said wheels and a means for receiving said radially extending tread engaging means of said tread adapter member.

References Cited by the Examiner

UNITED STATES PATENTS

| | | | |
|---|---|---|---|
| 45,359 | 12/64 | Sutter | 74—244 X |
| 568,623 | 9/96 | Mattfeldt et al. | 74—244 X |
| 1,336,131 | 4/20 | Chrislie | 180—9.3 X |
| 1,411,523 | 4/22 | Schlueter | 305—56 X |
| 1,413,100 | 4/22 | Cox | 305—56 X |
| 1,537,276 | 5/25 | Weier | 180—9.28 |
| 1,548,664 | 8/25 | Davis | 305—8 X |
| 1,558,432 | 10/25 | Wilson | 180—9.28 |
| 1,599,001 | 9/26 | Anderson et al. | 152—239 X |
| 1,616,673 | 2/27 | Bager et al. | 305—8 |
| 1,980,849 | 11/34 | Christie | 305—57 |
| 2,322,919 | 6/43 | Burns et al. | 105—215 |
| 2,625,229 | 1/53 | Van Voorhees | 180—9.3 X |
| 2,698,667 | 1/55 | Kropp | 180—6.7 X |
| 2,925,873 | 2/60 | La Porte | 180—9.28 X |
| 2,992,863 | 7/61 | Fredricks et al. | 152—220 X |

ARTHUR L. LA POINT, *Primary Examiner.*

LEO QUACKENBUSH, MILTON BUCHLER,
*Examiners.*